United States Patent Office 2,913,434
Patented Nov. 17, 1959

2,913,434

CATALYTIC PROCESS FOR MAKING STABLE ACROLEIN-PENTAERYTHRITOL CONDENSATES

Howard R. Guest, Charleston, Joe T. Adams, St. Albans, and Ben W. Kiff, Ona, W. Va., assignors to Union Carbide Corporation, a corporation of New York No Drawing. Application July 9, 1956
Serial No. 596,431

11 Claims. (Cl. 260—67)

This invention relates to a catalytic process for making liquid condensation products of acrolein and pentaerythritol which are stable on storage, and which on the addition of a second catalyst will cure to hard and tough polymers.

The formation of polymers by the condensation of acrolein and pentaerythritol is known, but the process has been given only limited attention. At present, two methods are known for carrying out the polymer reaction. According to one method, the reaction is carried out by first forming and isolating the unsaturated acetal resulting from the reaction of acrolein and pentaerythritol, having the structure:

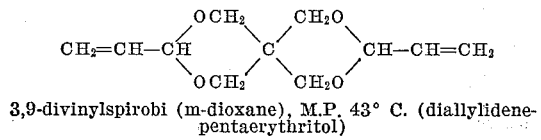

3,9-divinylspirobi (m-dioxane), M.P. 43° C. (diallylidene-pentaerythritol)

This unsaturated acetal is then reacted with a polyhydric alcohol in the presence of an acidic catalyst to yield a polymer. Suitable polyhydric alcohols include sorbitol, trimethylol ethane or trimethylol propane. This method has the disadvantage that isolation and purification of the intermediate acetal is required.

The practice of the second method involves the formation of a liquid pre-condensate by reacting acrolein and pentaerythritol in reciprocal proportion to their functionality. Thus, pentaerythritol has a functionality of four as a polyhydric alcohol, and acrolein has a functionality of three, considering the reactivity of both the carbonyl group and the olefinic group. The pre-condensate thus formed on reacting about three moles of pentaerythritol and about four moles of acrolein in the presence of an acid catalyst is a viscous liquid or A-stage resin which slowly condenses to a solid plastic. However, for practical applications, the condensation can be stopped by the neutralization of the catalyst. The neutral liquid pre-condensate can be stored until needed and can then be hardened into a plastic by the addition of a mineral acid or a strong organic acid. However, this method has the disadvantage that the resulting plastic materials have very poor impact strength.

Our invention is an improvement upon this second method whereby a stable pre-condensate is obtained without neutralization of the catalyst. We have discovered a catalyst which is a good catalyst for the first stage reaction of acetalization, but a poor catalyst for the second stage reaction of etherification. Thus, liquid products of a wide range of viscosity can be formed in the first stage, without danger of premature hardening of the batch in the kettle. This is of major importance as we have discovered that the properties of the final cured polymer are dependent on the viscosity of the liquid or A-stage resin. The catalyst which we use in this first stage reaction is hydrochloric acid. This catalyst has the additional advantage that it is volatile, and may be removed, in part, from the A-stage resin on completion of the first stage reaction, by distillation. A part of the catalyst may remain in the resin, possibly by chemical combination with olefinic groups present, but does not cause further polymerization. In fact, the A-stage resin, after removal of about one-half of the catalyst, shows no appreciable increase in viscosity upon storage at room temperature for several months. Upon the addition of a second acidic catalyst, other than hydrochloric acid, and heating, the liquid A-stage resin will cure to a hard, colorless to light colored plastic material having good resistance to heat and good impact strength. It is believed that such curing takes place by an etherification reaction between olefinic groups of the initial cyclic acetals formed and hydroxyl groups present in the A-stage condensate. No water is evolved in such etherification reaction, so no difficulty is encountered with shrinkage or pore formation in the castings. Thus, if desired, curing may be performed without resort to pressure.

As previously mentioned, the properties of the final cured resin can be adjusted by control of the viscosity of the A-stage resin. If the initial reaction is stopped, when the reaction mixture has a viscosity of 50 to 75 cps. at 25° C., the cured resins have higher heat distortion points of about 90° to 100° C., or higher, but impact strengths below about 1 (Izod, ft.-lb. per in. of notch). When the A-stage resin is permitted to react further, which may be done safely with hydrochloric acid as a catalyst, to a viscosity in the range of 75 to 350 cps. at 25° C., the cured polymers have impact strengths about 1 (Izod), and as high as 1.7 to 2, but the heat distortion points, in general, below 100° C. Blends of high viscosity and low viscosity resins, when cured, tend to have properties of intermediate value, but weighted, more heavily, towards those of the high viscosity resin.

After carrying the reaction to the desired viscosity, it is important to remove all volatile material from the resin, such as unreacted acrolein, water of acetal reaction, and as much of the hydrochloric acid as possible. This is done most conveniently by a stripping operation under reduced pressure.

While the viscosity of the reaction mixture can be used as a control measure to determine the resin viscosity desired, a more precise determination of the viscosity of the A-stage resin is accomplished after stripping off volatile material. Thus after removing volatile material, for instance, those which boil below 150° C. at atmospheric pressure, a low viscosity A-stage resin may be defined as one having a viscosity of 5000 to 25,000 cps. at 40° C. Similarly, a high viscosity resin may be considered to have a viscosity of 25,000 to 500,000 cps. at 40° C.

We have found that small amounts of hydrochloric acid are effective catalysts. The preferred amount of hydrochloric acid to use to catalyze the reaction between acrolein and pentaerythritol is from about 0.10% to about 0.40% based on the total weight of reactants. At concentrations below 0.10% the reaction rate is too low. When more than 0.40% is used the viscosity of the reaction mixture becomes higher than is desirable. When the catalyst is used within these limits about half of it is distilled out in the stripping operation while the remainder becomes part of the structure of the resin.

The reaction to produce the A-stage material is best accomplished at 70 to 80° C. although it can be run as low as 60° C. and range as high as 100° C. The reaction time may be varied from 30 minutes to five hours depending upon the viscosity desired. The molar ratio of acrolein to pentaerythritol may be varied from 1.3/1 to 1.9/1 and also affects the resin viscosity.

After the A-stage resin is formed and the volatile material stripped off, any one of a number of strong acids or acid-reacting compounds can be used to cure the resin. Among these are sulfuric acid, toluenesulfonic acid, phosphoric acid, stannic chloride, titanium tetrachloride, aluminum chloride, ferric chloride, boron trifluoride and "mixed alkanesulfonic acids" (a commercial mixture which is predominantly ethanesulfonic acid but which contains some methanesulfonic and propanesulfonic acids).

The curing temperature for the resin can range from 50° C. to 200° C. with the preferred range being 70° C. to 150° C. The required curing time, of course, varies with the temperature. At 50° C. as long as 72 hours may be required while at 150° C. as little as 10 minutes may be sufficient. At 70° C. the usual curing time is 16 hours while at 100° C. from three to eight hours is required.

The following table shows the poor physical properties of resins made by the prior art method of neutralization of the A-stage catalysts prior to curing. The test resins were made by reacting in the presence of an acid catalyst, acrolein and pentaerythritol in the molar ratio of about 4 to 3 at a temperature of 70° C. to 75° C. for reaction periods of 1.5 to 2.5 hours. Then, the catalyst was neutralized, except for a control run, with various bases. At the completion of the neutralization, volatile materials were stripped off at kettle temperature of about 76° C./4–6 mm. Then, an acid catalyst was added to the neutral resin, the mixtures cured for several hours at 100° C. and the physical properties of the cured specimens determined.

TABLE I

| Reaction Catalyst Acid, Percent | Base for Neutralization | Curing Catalyst Acid, Percent | Heat Distortion, °C. | Impact Strength (Izod) (ft.-lbs. per in.) |
| --- | --- | --- | --- | --- |
| Sulfuric, 0.2 | None | Same | 90 | 1.18 |
| Sulfuric, 0.08 | Na(CO₃)₂ | Toluenesulfonic, 0.3 | 49 | 0.66 |
| Do | CA CO₃ | do | 57 | 0.60 |
| Toluenesulfonic, 0.25 | NaOOCCH₃ | do | 92 | 0.4 |
| Do | NaOOCCH₃ | Alkanesulfonic, 0.3 | 102 | 0.3 |

The cured resins of this invention may be used in any of the applications where rigid plastic materials of good strength and toughness, and light in color, are desired. Also, because of their excellent light stability and resistance to hydrolysis they are valuable for many fields now served by the methyl methacrylate resins, such as display signs, ornaments, fixtures, and dentures. The liquid resins may also be used for sealing and potting compounds in the electrical industry. They are also valuable as laminating resins in making laminates of glass cloth.

The following examples will serve to illustrate the invention:

*Example 1.—Preparation of high viscosity resin with hydrochloric acid condensation catalyst*

A charge of 121 grams pentaerythritol, 86 grams of acrolein (96.2%) and 0.898 grams of hydrochloric acid (37%) was placed in a 500-ml. reaction flask which was equipped with a stirrer, thermometer, condenser, and a nitrogen purge line. After reaction for one hour at 75° C., the viscosity of the reaction mixture was 168 c.p.s. at 25° C. The material was then stripped to 76° C./4 mm. A portion of the material when heated at 100° C. for 8 hours did not cure. Toluenesulfonic acid (0.38%) was added to the remaining material and it was cured for 8 hours at 100° C. The cured bar had these properties:

| | |
| --- | --- |
| Heat distortion ° C. | 60 |
| Flexural modulus p.s.i. | 407,000 |
| Hardness durometer "D" | 82 |
| Impact strength (Izod) (ft.-lbs. per in. of notch) | 1.62 |

*Example 2.—Preparation of low viscosity resin with hydrochloric acid as condensation catalyst*

A charge of 86 grams of acrolein (96.2%), 121 grams pentaerythritol and 0.898 gram of 37% hydrochloric acid was placed in the apparatus described in Example 1. After reaction for 30 minutes at 75–76° C. the viscosity was 63 c.p.s. at 25° C. The volatile material was distilled off and 0.3% toluenesulfonic acid was added. The resin was poured into bar molds and cured for 8 hours at 100° C. The bars had the following properties:

| | |
| --- | --- |
| Heat distortion °C. | 101 |
| Flexural modulus p. s. i. | 379,000 |
| Hardness durometer "D" | 84 |
| Impact strength (Izod) (ft.-lbs. per in. of notch) | 0.84 |

*Example 3.—Stripped low viscosity resin*

To a two-liter reaction flask equipped with a stirrer, thermometer, condenser and nitrogen feed line, there were charged 798 grams of 96.6% acrolein (13.75 moles), 1127 grams of pentaerythritol (9.29 moles) and 6.24 grams of 37% hydrochloric acid. The reaction charge was heated to 72° C. and held at 72–74° C. for 25 minutes. At the end of this time, the viscosity of the reaction mixture was 63 c.p.s. at 25° C.

Volatile material was then distilled off to a kettle temperature of 71° C./7.5 mm. The residual A-stage resin had the following properties:

| | |
| --- | --- |
| Viscosity at 40° C. c.p.s. | 11,520 |
| Equivalent weight by hydroxyl analysis | 167 |
| Observed molecular weight (uncorrected for low-molecular weight components) | 362 |
| Equivalent weight by unsaturation analysis | 234 |
| Unreacted pentaerythritol percent | 3 |

To a sample of the stripped A-stage resin was added 0.3% mixed alkanesulfonic acids catalyst, and the samples cured for 8 hours at 100° C. The cured polymer had the following properties:

| | |
| --- | --- |
| Heat distortion, ° C. | 93 |
| Flexural modulus, p.s.i. | 369,000 |
| Hardness durometer "D" | 85 |
| Impact strength (Izod) (ft.-lbs. per in. of notch) | 0.8 |

*Example 4.—Stripped high viscosity resin*

To the same reactor used in Example 3, there was charged a reaction mixture of the same properties. The mixture was heated to 74° C. and maintained at 74 to 76° C. for 55 minutes. At the end of that time, the viscosity of the reaction mixture was 312 cps. at 25° C. The volatile material was then distilled off to a kettle temperature of 79° C./7 mm. The stripped A-stage resin had the following properties:

Viscosity at 40° C. _____ cps__ 192,000
Equivalent weight by hydroxyl analysis _____ 192
Observed molecular weight (uncorrected for low-molecular components) _____ 498
Equivalent weight by unsaturation _____ 314
Unreacted pentaerythritol _____ percent__ 1

To a sample of the stripped A-stage resin was added 0.3% mixed alkanesulfonic acids, and the samples cured for 8 hours at 100° C. The cured polymer had the following properties:

Heat distortion, ° C. _____ 83
Flexural modulus, p.s.i. _____ 333,000
Hardness durometer "D" _____ 85
Impact strength (Izod) (ft.-lbs. per in. of notch) _____ 1.19

*Example 5.—Examples of resins made with hydrochloric acid as condensation catalyst and various curing catalysts*

A charge of 232 grams acrolein (94.1%), 320 grams pentaerythritol and 1.79 grams of 37% hydrochloric acid was placed in the reactor described in Example 1. After reaction for 30 minutes at 75° C. the mixture had a viscosity of 89 cps. at 25° C. The volatile material was distilled off and the residue divided into 3 portions. To one portion there was added 0.3% toluenesulfonic acid and it was poured into molds and cured at 100° C. for 8 hours. The cured bar had the following properties:

Heat distortion, ° C. _____ 69
Impact strength (Izod) (ft.-lbs. per in. of notch) ___ 1.62

To another portion there was added a mixture of 0.2% stannic chloride and 0.2% toluenesulfonic acid. This mixture was cured 8 hours at 100° C. One of the bars had these properties:

Heat distortion ° C. _____ 65
Impact strength (Izod) (ft.-lbs. per in. of notch) __ 2.11

To the remaining portion there was added 0.25% boron trifluoride etherate. After curing at 100° C. for 8 hours a bar of this material had these properties:

Heat distortion, ° C. _____ 64
Flexural modulus, p.s.i. _____ 395,000
Hardness durometer "D" _____ 84
Impact strength (Izod) (ft.-lbs. per in. of notch) _____ 1.4

*Example 6*

A charge of 310 grams of pentaerythritol, 221 grams of acrolein (96.2%), and 1.72 grams of 37% hydrochloric acid was placed in the reactor described in Example 1. After reaction for 1½ hours at 75–78° C. the volatile material was stripped off to a kettle temperature of 76° C./4 mm. A portion of the stripped resin (160 grams) was mixed with a solution of 0.4 gram sulfuric acid in 25 cc. ethyl ether. The ether was stripped off to a kettle temperature of 75° C./3.5 mm. Bars cast in the usual way were cured for 16 hours at 70° C. and had these properties:

Heat distortion, ° C. _____ 91
Flexural modulus, p.s.i. _____ 353,000
Hardness durometer "D" _____ 84
Impact strength (Izod) (ft.-lbs. per in. of notch) _____ 1.28

*Example 7*

A charge of 86 grams of acrolein (96.2%), 121 grams pentaerythritol, and 0.898 gram of HCl (37%) was charged to the apparatus described in Example 1. After heating for one hour at 76° C. the mixture had a viscosity of 238 cps. at 25° C. The volatile material was then distilled off and 144 grams of the stripped resin was charged to a reaction flask equipped with a stirrer. While the resin was stirred there was added 0.4932 gram of mixed alkane-sulfonic acid dropwise. Bars cured from this material at 100° C. for 8 hours had the following properties:

Heat distortion, ° C. _____ 82
Flexural modulus, p.s.i. _____ 384,000
Hardness durometer "D" _____ 84
Impact strength (Izod) (ft.-lbs. per in. of notch) _____ 1.36

*Example 8.—Attempt to cure resin using large amounts of hydrochloric acid as catalyst*

To the apparatus described in Example 1, there were charged 407 grams of acrolein (96.2%), 500 grams of pentaerythritol and 3.93 grams of 37% hydrochloric acid. The mixture was heated to 74° C. and held at that point for 30 minutes. At the conclusion of that time the material was stripped to 74° C. at 4 mm. The weight of the stripped A-stage was 672 grams. To 92 grams of this material there was added 0.755 of 37% hydrochloric acid. On a contained basis this was 0.30% of the catalyst. This material was poured into molds and heated for 3 hours at 60° C. then for 8 hours at 100° C. The resin did not cure at all but was about as fluid as the original A-stage composition.

To another 90 grams of the A-stage resin there was added 1.516 grams of 37% hydrochloric acid. This was 0.62% on a contained basis. The material was poured into molds and heated at 60° C. for 2¾ hours then at 100° for 8 hours. The resin was cured only slightly at the end of that time to a soft gel.

To 90 grams of similar A-stage material there was added 1.34% hydrochloric acid (on a contained basis). This material was poured into molds and allowed to stand at room temperature for 72 hours. The resin was then heated for 4½ hours at 70° C. and 8 hours at 100° C. The bars were only incompletely cured. They were soft and flexible and were tacky on the exposed surface.

To another 91 grams of the A-stage resin there were added 3.5739 grams of 37% hydrochloric acid. This was 1.45% of the catalyst on a contained basis. The material was poured into molds and cured for 2¼ hours at 60° C. and 8 hours at 100° C. The cured resin had these properties:

Heat distortion, °C. _____ 46
Flexural modulus, p.s.i. _____ 374,000
Hardness durometer "D" _____ 81
Impact (Izod) (ft.-lbs. per in. of notch) _____ 1.5

To another 90 grams of the A-stage composition there were added 5.149 grams of 37% hydrochloric acid. This was 2.12% on a contained basis. This mixture was poured into molds and cured 1½ hours at 60° C. and 8 hours at 100° C. The cured resin had these properties:

Heat distortion, °C. _____ 41
Flexural modulus, p.s.i. _____ 300,000
Hardness durometer "D" _____ 79
Impact (Izod) (ft.-lbs. per in. of notch) _____ 1.2

This example shows the necessity of using an acid catalyst, other than hydrochloric, for the second stage, or curing, reaction. Only at excessive acid concentrations is any cure obtained, and the cured bars have low heat distortion points.

What is claimed is:

1. A process for forming synthetic resins which comprises reacting acrolein and pentaerythritol in the presence of hydrochloric acid as a catalyst to form a liquid resin, wherein the molar ratio of acrolein reacted with the pentaerythritol varies from 1.3 to 1.9 moles of acrolein per mole of pentaerythritol, distilling off from said liquid resin volatile material which contains free hydrochloric acid and which distills from the liquid resin under the conditions of atmospheric pressure and temperatures up to 150° C. to form a stable liquid resin having a viscosity of 5,000 to 500,000 c.p.s. at 40° C. and curing the liquid resin to a solid resin by heating in the presence of an acidic curing catalyst selected from the group consisting of sulfuric acid, toluenesulfonic acid, phosphoric acid, stannic chloride, titanium tetrachloride, aluminum chloride, ferric chloride, boron trifluoride and mixed alkanesulfonic acids.

2. The process of claim 1 wherein the viscosity of the liquid resin after the removal of volatiles and hydrochloric acid has a viscosity of 5,000 to 25,000 c.p.s. at 40° C.

3. The process of claim 1 wherein the viscosity of the liquid resin after the removal of volatiles and hydrochloric acid has a viscosity of 25,000 to 500,000 c.p.s. at 40° C.

4. The process of claim 1 wherein the curing catalyst is sulfuric acid.

5. The process of claim 1 wherein the curing catalyst is toluenesulfonic acid.

6. The process of claim 1 wherein the curing catalyst is mixed alkanesulfonic acids.

7. The process of claim 1 wherein the curing catalyst is boron trifluoride.

8. The process of claim 1 wherein the curing catalyst is stannic chloride.

9. A process for forming synthetic resins which comprises reacting acrolein and pentaerythritol in the presence of hydrochloric acid as a catalyst to form a liquid resin wherein the molar rato of acrolein reacted with the pentaerythritol varies from 1.3 to 1.9 moles af acrolein per mole of pentaerythritol, distilling off from said liquid resin voltatile material which contains free hydrochloric acid and which distills from the liquid resin under the conditions of atmospheric pressure and temperatures up to 150° C. to form a stable liquid resin having a viscosity of 5,000 to 500,000 c.p.s. at 40° C. which is curable by heating in the presence of an acidic curing catalyst to form a solid resin.

10. The process of claim 9 wherein the viscosity of the stable liquid resin varies from 5,000 to 25,000.

11. The process of claim 9 wherein the viscosity of the stable liquid resin varies from 25,000 to 500,000.

References Cited in the file of this patent

FOREIGN PATENTS 870,032    Germany _____ Mar. 9, 1953

OTHER REFERENCES

Schulz et al.: Angewandte Chemistry, volume 62, Number 5, pp. 105, 113, 114, 117, and 118. (Copy in Science Library.)

Pauling: General Chemistry, Freeman, 1947, page 396. (Copy in Science Library.)